US006812961B1

(12) United States Patent
Parulski et al.

(10) Patent No.: US 6,812,961 B1
(45) Date of Patent: Nov. 2, 2004

(54) SYSTEM AND CAMERA FOR AUTOMATICALLY FORWARDING DIGITAL IMAGES TO A SERVICE PROVIDER

(75) Inventors: Kenneth A. Parulski, Rochester, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/569,079

(22) Filed: May 11, 2000

(51) Int. Cl.$^7$ .......................... H04N 5/76; H04N 5/225; H04N 5/232; G06F 17/60

(52) U.S. Cl. .............. 348/231.2; 348/207.1; 348/211.3; 348/211.1; 705/26

(58) Field of Search .......... 348/231.2, 231.3, 348/207.1, 231.9, 552, 211.3, 211.1; 705/26

(56) References Cited

U.S. PATENT DOCUMENTS

| | | | | |
|---|---|---|---|---|
| 5,164,831 A | * | 11/1992 | Kuchta et al. ............ | 348/231.7 |
| 5,327,265 A | * | 7/1994 | McDonald .................. | 358/527 |
| 5,418,565 A | | 5/1995 | Smith | |
| 5,432,871 A | * | 7/1995 | Novik ........................ | 382/232 |
| 5,479,206 A | | 12/1995 | Funazaki et al. | |
| 5,523,794 A | * | 6/1996 | Mankovitz et al. ........... | 705/14 |
| 5,633,678 A | * | 5/1997 | Parulski et al. .......... | 348/231.5 |
| 5,666,159 A | * | 9/1997 | Parulski et al. .......... | 348/211.2 |
| 5,696,850 A | * | 12/1997 | Parulski et al. ............. | 382/261 |
| 5,903,309 A | * | 5/1999 | Anderson .............. | 348/333.02 |
| 5,917,542 A | | 6/1999 | Heberling et al. | |
| 5,974,401 A | * | 10/1999 | Enomoto et al. ............. | 705/40 |
| 6,198,526 B1 | * | 3/2001 | Ohtsuka ....................... | 355/40 |
| 6,313,926 B1 | * | 11/2001 | Kumagai et al. ........... | 358/442 |
| 6,381,666 B1 | * | 4/2002 | Kejser et al. ............... | 710/300 |
| 6,564,056 B1 | * | 5/2003 | Fitzgerald ................... | 340/5.1 |
| 6,654,051 B1 | * | 11/2003 | Fujita et al. ............. | 348/231.1 |
| 6,657,658 B2 | * | 12/2003 | Takemura .............. | 348/207.99 |
| 6,657,702 B1 | * | 12/2003 | Chui et al. .................... | 355/40 |
| 2003/0142215 A1 | * | 7/2003 | Ward et al. .............. | 348/207.1 |

FOREIGN PATENT DOCUMENTS

| | | | | |
|---|---|---|---|---|
| EP | 0 860 980 | | 8/1998 | |
| EP | 0 860 981 | | 8/1998 | |
| JP | 11191870 A | * | 7/1999 | ............ H04N/5/76 |
| WO | 00/01138 | | 1/2000 | |
| WO | 00/70872 | | 11/2000 | |

OTHER PUBLICATIONS

PC Card Standard, Release 2.0, published by the Personal Computer Memory Card International Association, Sunnyvale, CA, Sep. 1991.
CompactFlash Specification Version 1.3, published by the CompactFlash Association, Palo Alto, CA, Aug. 5, 1998.
Digital Still Camera Image File Format (Exif), version 2.1, Jul. 1998 by the Japan Electronics Industries Development Association (JEIDA), Tokyo, Japan.
Design Rule For Camera File System, version 1.0, Dec. 1998 by the Japan Electronics Industries Development Association (JEIDA), Tokyo, Japan.
JP Abstract; vol. 1999, No. 12; Oct. 29, 1999; JP Abstract 11 191870 A (Fuji Photo Film Co. Ltd.; Jul. 13, 1999.

* cited by examiner

Primary Examiner—Wendy R. Garber
Assistant Examiner—Lin Ye
(74) Attorney, Agent, or Firm—Frank Pincelli

(57) ABSTRACT

A method and digital camera for capturing images for requesting and confirming an image order to be provided by a service provider. The camera includes a capture device for capturing digital images and an interface for storing the captured digital images on a removable digital storage media in a first directory, and for reading digital images from both the first directory and from a second directory on the removable digital storage media. A user interface is provided for selecting the first directory or the second directory. The camera also has a display for displaying information and image stored in the selected directory. The second directory can be used for placing an image order and/or reviewing confirmation provided by a service provider of an image order.

13 Claims, 6 Drawing Sheets

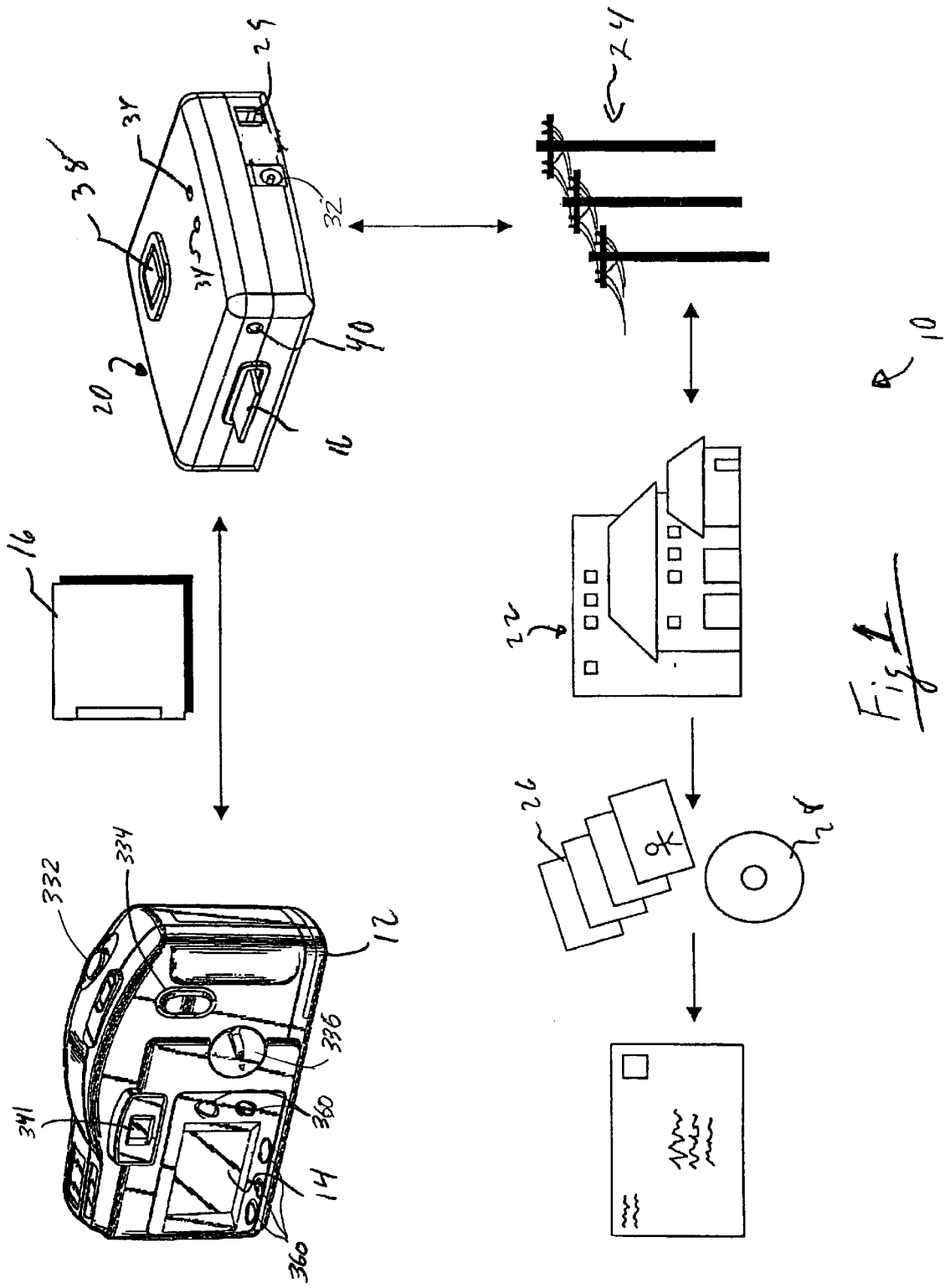

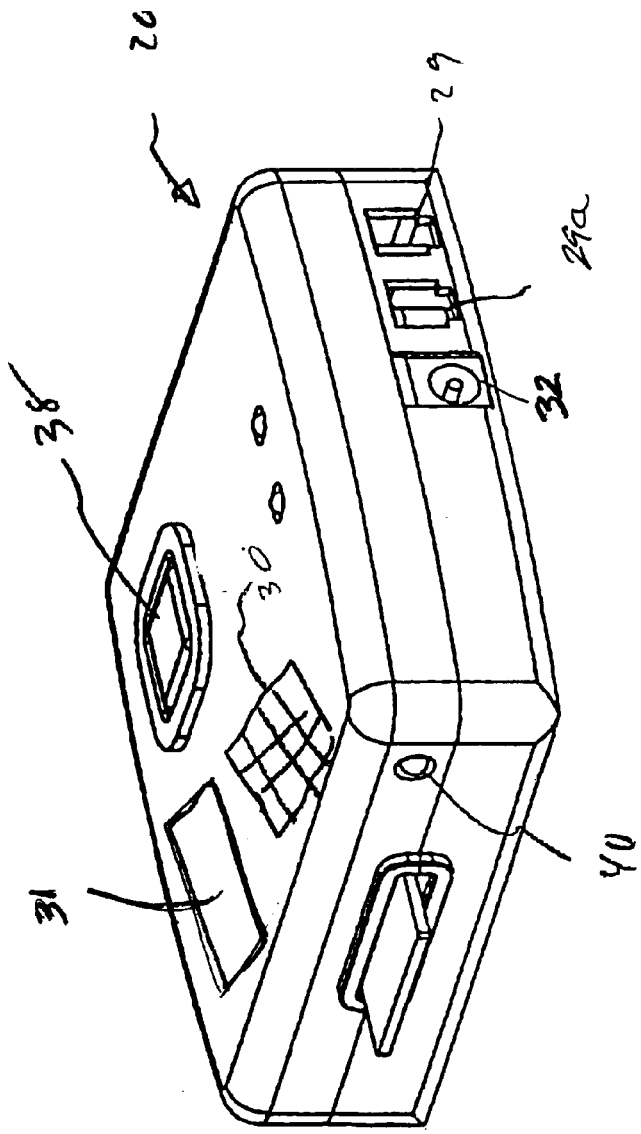

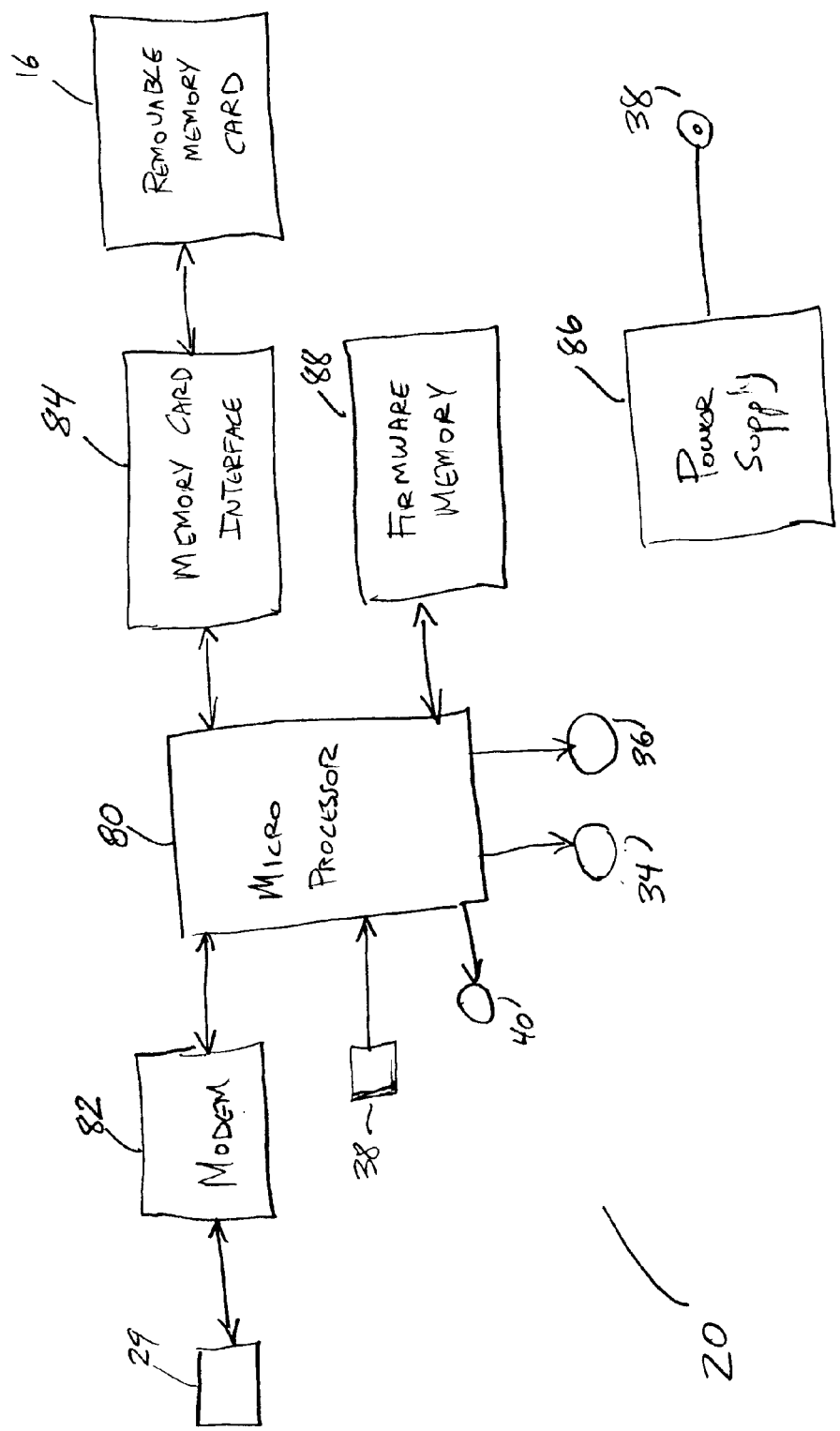

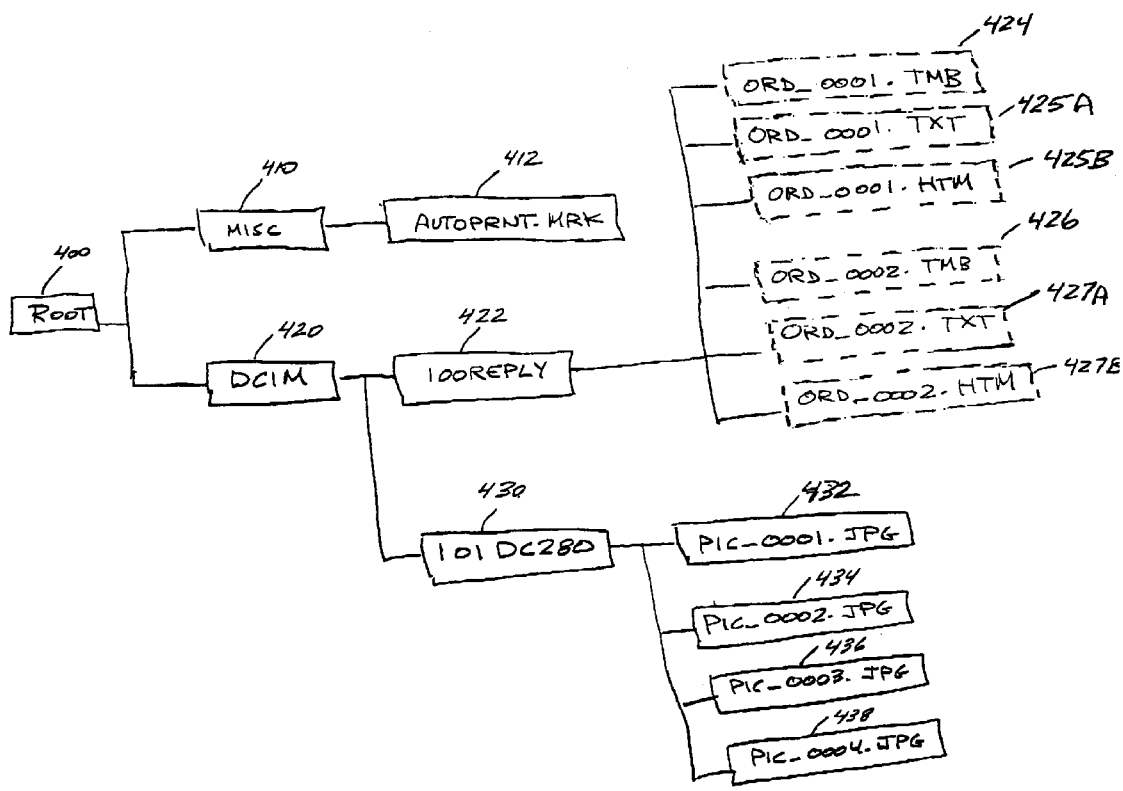

SYSTEM AND CAMERA FOR AUTOMATICALLY FORWARDING DIGITAL IMAGES TO A SERVICE PROVIDER

CROSS REFERENCE TO RELATED APPLICATIONS

U.S. Ser. No. 09/569,170, filed May 11, 2000, entitled "SYSTEM AND APPARATUS FOR AUTOMATICALLY FORWARDING DIGITAL IMAGES TO A SERVICE PROVIDER".

FIELD OF THE INVENTION

The present invention is directed to an apparatus and system for forwarding digital images. More particularly, to an apparatus and system for automatically forwarding digital images captured by a digital camera on a memory card to a service provider over a communication network.

BACKGROUND OF THE INVENTION

As prices of digital cameras fall, image quality improves and ease of use increases, more and more consumers will use electronic digital cameras to fill their image capturing needs. Digital electronic cameras offer many benefits. However, they also present some difficulties. In particular, obtaining high quality prints from electronic digital cameras may be difficult.

There are many methods for printing images from electronic cameras. Image files may be transferred to a computer via physically transferring a memory card or by a data link between the computer and the camera. Once the image resides in the memory of the computer, a computer program can be used to print the images on a local printer. Also, a computer may use a modem to transfer images over the phone lines or other communication network to a remote photofinisher wherein images may be printed. While the foregoing methods can be used to obtain prints from the digital image files, there are often time consuming and can often require complex use of a computer.

Another method of getting hard copy prints from digital image files captured by an electronic digital camera is to transfer the digital image files directly to a printer via transferring a memory card or by a data link between the printer and the camera. This approach may have equal appeal according to ease of use, but the quality of the print is limited to the print quality of the local printer. Additionally, the consumer is forced to maintain the printer.

Digital images may also be printed at a retail kiosk where the digital image files are transferred to an internal computer or to a printer via physically transferring the memory card or by transferring the digital data by a data link between the kiosk and camera. The utility of the kiosk is limited by its physical location, thus requiring a specific time for the consumer to access these machines which are typically only accessible during business hours.

As described in commonly-assigned U.S. patent application Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference, there exists in the prior art digital electronic cameras that have built-in communication modems. These cameras may be used to send digital image files directly to a photofinisher. However, the camera must be connected to the transmission line for the duration of the transfer of the digital image files, and is of course out of service as a portable image capture device during this time period. Also, the interface for connecting the camera to the photofinishing camera can be unfamiliar and difficult to use.

As described in commonly-assigned U.S. Pat. No. 5,666,159 "ELECTRONIC STILL CAMERA WITH PROGRAMMABLE TRANSMISSION CAPABILITY" to Parulski et. al., the disclosure of which is herein incorporated by reference, there also exists in the prior art cellular phones with built-in camera modules. The cellular modems in these phones may be used for transferring digital image files to a photofinisher. However, transmission time may be expensive, and owing to the size of the digital image files for high quality images, transmission times can be very long and excessively drain the batteries of the cellular phone.

The present invention provides a simple and economic solution to the problems of the prior art by providing a system an apparatus which allows for automatically forwarding digital image data automatically which is simple in construction and easy to use.

SUMMARY OF THE INVENTION

In accordance with one aspect of the present invention there is provided a digital camera for capturing images to be provided to a service provider, comprising:

means for capturing digital images;

an interface for storing the captured digital images on a removable digital storage media in a first directory, and for reading digital images from both the first directory and from a second directory on the removable digital storage media, wherein the second directory contains images stored by the service provider, a user interface for selecting the first directory or the second directory; and a display for displaying the digital images from the selected directory.

In accordance with another aspect of the present invention there is provided a digital camera for capturing images to be provided to a service provider, comprising:

a capture device for capturing digital images;

an interface for storing the captured digital images on a removable digital storage media in a first directory, and for reading digital images from both the first directory and from a second directory on the removable digital storage media, wherein the second directory contains images obtained from a different source other than the camera.

a user interface for selecting the first directory or the second directory; and a display for displaying the digital files stored in the second directory.

In accordance with yet another aspect of the present invention there is provided a method for placing and/or reviewing an image order using a camera having a capture device for capturing digital images;

an interface for storing the captured digital images on a removable digital storage media in a first directory; and for reading digital images from both the first directory and from a second directory on the removable digital storage media wherein the second directory contains confirmation files stored by the service provider;

a user interface for selecting the first directory or the second directory; and a display for displaying the digital files stored in the second directory, comprising the steps of:

selecting images in the first directory and placing them in the second directory and placing an order with respect to the images in the second directory.

In still another aspect of the present invention there is provided a method for placing and/or reviewing an image order using a camera having a capture device for capturing digital images;

an interface for storing the captured digital images on a removable digital storage media in a first directory and for reading digital images from both the first directory; and from a second directory on the removable digital storage media wherein the second directory contains confirmation files stored by the service provider;

a user interface for selecting the first directory or the second directory; and a display for displaying the digital files stored in the second directory, comprising the steps of:

reviewing the confirmation file with respect to the images in the second directory.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIG. 1 illustrates in block form a system and apparatus made in accordance with the present invention;

DETAILED DESCRIPTION OF THE INVENTION

Figure 4:
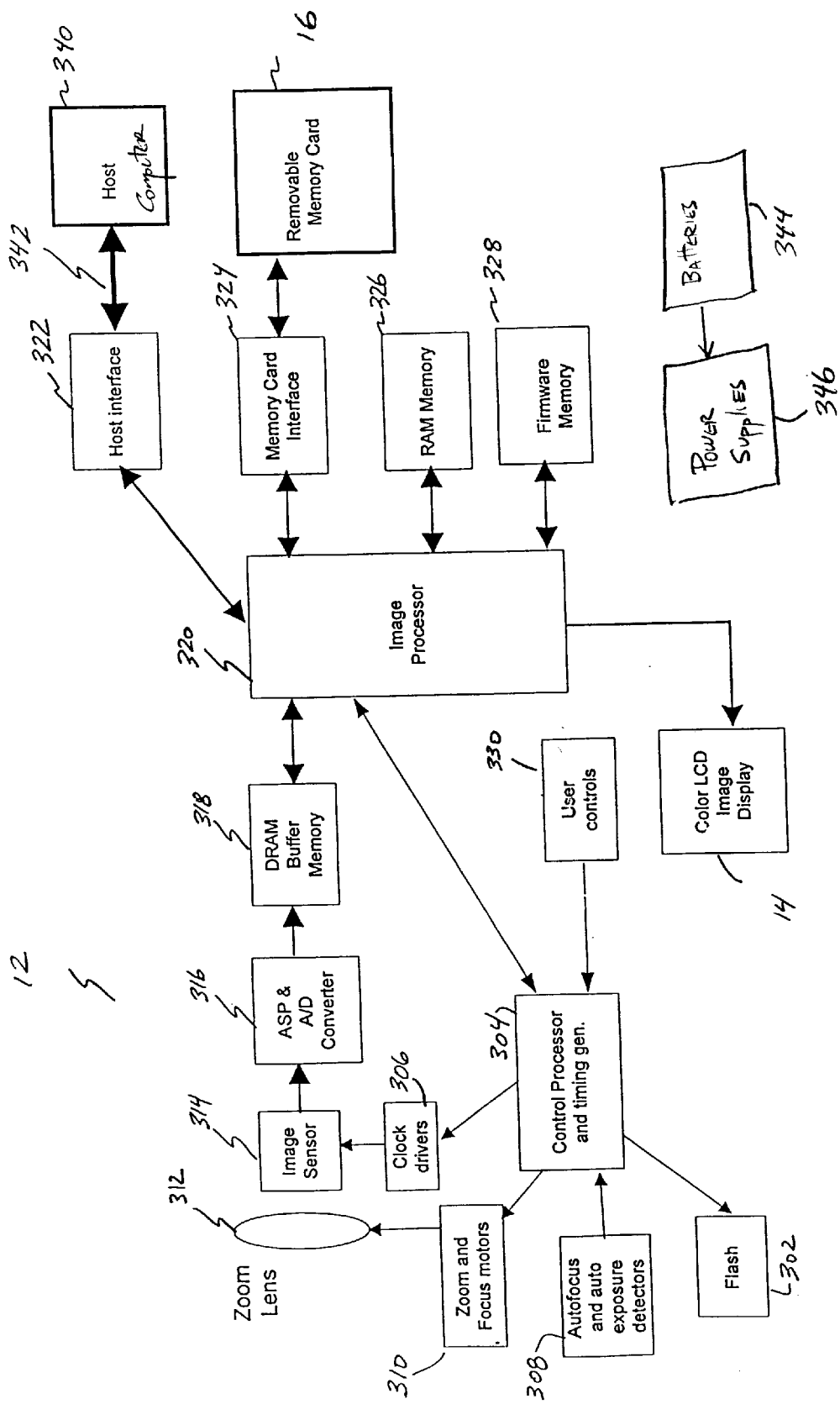
FIG. 4 illustrates in block form the camera depicted in FIG. 1.

FIG. 1 illustrates a system 10 made in accordance with the present invention. The system 10 includes an electronic digital still camera 12. The camera is shown in block diagram form in FIG. 4.

The digital camera 12 produces digital images that are stored on the removable memory card 16. The camera is powered by batteries 344 which connect to power supply 346 which supplies power to the camera circuits depicted in FIG. 4. The digital camera 12 includes a zoom lens 312 having zoom and focus motor drives 310 and an adjustable aperture and shutter (not shown). The user composes the image using the optical viewfinder 341 and the zoom lens control 334, and then depresses the shutter button 332 to begin capture of a still image. The zoom lens 312 focuses light from a scene (not shown) on an image sensor 314, for example, a single-chip color CCD image sensor, using the well-known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and auto-exposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory.

The processed digital image file is provided to a memory card interface 324 which stores the digital image file on the removable memory card 16. Removable memory cards 16 are one type of removable image digital storage medium, and are available in several different physical formats. For example, the removable memory card 16 can include memory cards adapted to the PCMCIA card interface standard, as described in the *PC Card Standard, Release* 2.0, published by the Personal Computer Memory Card International Association, Sunnyvale, Calif., September 1991. The removable memory card 16 can also be adapted to the Compact Flash interface standard, such as described in the *CompactFlash Specification Version* 1.3, published by the CompactFlash Association, Palo Alto, Calif., Aug. 5, 1998, or to the well-known SmartMedia, MemoryStick or SD memory card formats. Other types of removable image digital storage media, such as magnetic hard drives, magnetic tape, or optical disks, can alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 16. The JPEG file uses the so-called "Exif" image format defined in "*Digital Still Camera Image File Format (Exif)*" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings, and image captions or comments that can be selected or entered by the camera user.

The processor 320 also creates a low-resolution "thumbnail" size image, which can be created as described in commonly-assigned U.S. Pat. No. 5,164,831 "ELECTRONIC STILL CAMERA PROVIDING MULTI-FORMAT STORAGE OF FULL AND REDUCED RESOLUTION IMAGES" to Kuchta, et. al., the disclosure of which is herein incorporated by reference. This thumbnail image has 160×120 pixels, to conform to the DCF rules described later, and is stored in RAM memory 326 and supplied to the color LCD image display 332.

Figure 6:
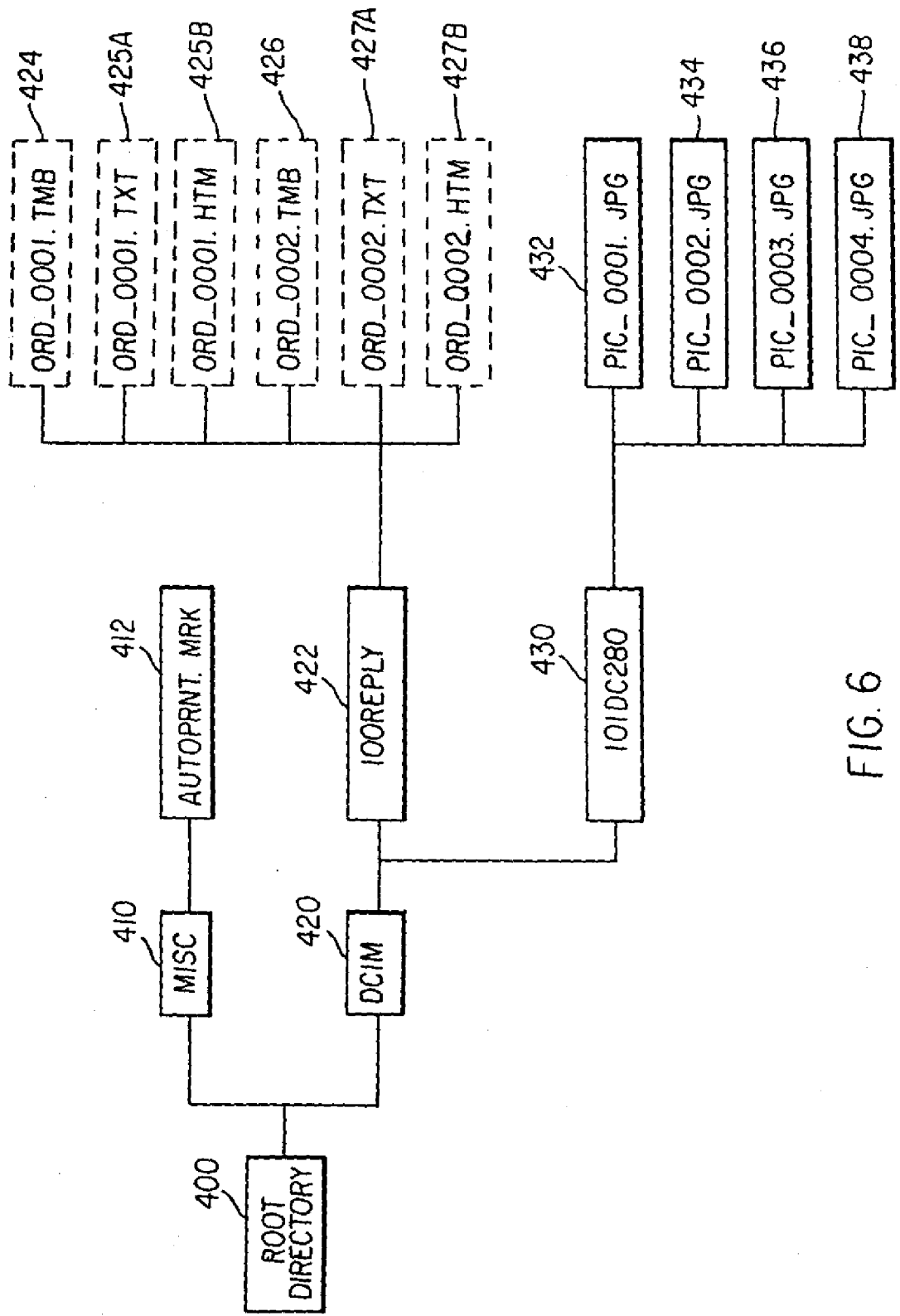
FIG. 6 illustrates the arrangement of files stored on a removable memory card by the camera and transmitting device.

The Exif image file, containing the JPEG compressed main image, thumbnail image, and the image metadata, are stored on the removable memory card 16 using a directory structure conforming to the so-called "DCF" rules defined in "*Design Rule For Camera File System*" version 1.0, December 1998 by the Japan Electronics Industries Development Association (JEIDA), Tokyo, Japan. An example directory structure recorded on DOS formatted memory card 16 by the camera 12 and the communication device 20 is depicted in FIG. 6. Two directories are recorded under the root directory 400, MISC directory 410 containing a file 412 named AUTOPRNT.MRK and DCIM directory 420 which contains subdirectories 422 and 430. File 412 is a Digital Printer Order Format (DPOF) file which specifies images to be printed, as will be described later. Subdirectory 430 is named 101DC280, to conform to the DCF rules, and contains four JPEG compressed Exif image files, PIC__0001.JPG 432, PIC__0002.JPG 434, PIC__0003.JPG 436, and PIC__0004.JPG 438. Files 432, 434, 436, and 438 are Exif image files captured by the digital camera.

Subdirectory 422 is named 100REPLY, to conform to the DCF rules. The purpose of subdirectory 422 is to provide a known location for the communication device 20 to store confirmation files onto removable memory card 16 as the images stored by the digital camera 12 in subdirectory 430 are transmitted to the service provider 22. These confirmation files are reviewed when the removable memory card 16 is then removed from communication device 20 and inserted in digital camera 12. The confirmation files stored in subdirectory 422 by communication device 20 can include the thumbnail size JPEG compressed image confirmation files, file 424 named ORD__0001.TMB and file 426 named ORD__0002.TMB, the corresponding text confirmation files, file 425A named ORD__0001.TXT and file 427A named ORD__0002.TXT, or the corresponding HTML (hyper-text markup language) confirmation files, file 425B named ORD__0001.HTM and file 427B named ORD__0002.HTM, or a combination of these JPEG image files, text files, and HTML files. Files 424, 425A, 425B, 426, 427A, and 427B are recorded on the removable memory card 16 by the communication device 20, as will be described later.

The graphical user interface displayed on the color LCD image display 332 is controlled by mode dial 336 and push buttons 360 shown in FIG. 1. The electronic camera 300 can also include a video output driver and connector (not shown) for displaying the captured images or the print status information on a TV (not shown). The user places the mode dial 336 in the "capture" position prior to capturing images. The user places the mode dial 336 in the "review" position in order to review the captured images (e.g. image files 432, 434, 436 and 438 in FIG. 6.) The user can review the image files and delete undesirable images using push buttons 360.

When the mode dial 336 is in the "place order" position, the user can decide which images to print, and how many copies to make. The camera creates an image utilization file, as described in commonly-assigned U.S. Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference. Using push buttons 360, the user provide instructions concerning whether to print all or some of the image files (e.g. files 432, 434,436, and 438 in FIG. 6) stored on memory card 16, and how many copies to make of each particular file. File 412, named AUTOPRNT.MRK, is an ASCII text file containing these instructions, and is known as a Digital Print Order Format (DPOF) file.

In one embodiment, the mode dial 336 includes an "order status" position. This order status mode allows the user to review any confirmation files written by communication device 20 into the 100REPLY folder 422 on removable memory card 16. The confirmation files in folder 422 indicate the status of previous print orders made using this memory card. The confirmation files include thumbnail images (e.g. thumbnail image files 424 and 426 in FIG. 6) that can be viewed as standard images on any DCF compliant digital camera. These thumbnail images may contain information text messages, icons, etc. The confirmation files can also include text confirmation files (e.g. the ORD__0001.TXT file 425A and the ORD__0002.TXT file 427A) or html confirmation files (e.g. the ORD__0001.HTM file 425B and the ORD__0002.HTM file 427B) that can be viewed on a camera designed to support these file types. The text confirmation files 425A and 427A and the html confirmation files 425B and 427B may contain detailed information concerning order status, special pricing advertisements, etc., that the user can scroll through using user controls 330. These file types allow more detailed confirmation information to be conveyed in a small size file, compared to the JPEG thumbnail confirmation files 424 and 426. The user can review the confirmation files in 100REPLY folder 422, and delete some or all of the confirmation files if desired, using push buttons 360, 362, and 364 in FIG. 2.

In an alternative embodiment, the mode dial 336 does not include the "order status" position. Instead, when the mode dial 336 is placed in the "review" position (or alternatively whenever the camera is powered on), the image processor 320 checks the files on the removable memory card 16 to determine if there are any confirmation files in the 100REPLY folder 442. If there are confirmation files in folder 442, the first confirmation file is automatically displayed to the user. The user can review all of the confirmation files in 100REPLY folder 422, and delete some or all of the confirmation files if desired, using push buttons 360, 362, and 364 in FIG. 2.

An interface cable 342 can be used to connect between the host interface 322 in the electronic camera 12 and the corresponding camera interface in the host computer 340. The interface cable 342 may conform to, for example, the well-know universal serial bus (USB) interface specification. This interface can be used to download images from removable memory card 16 to host computer 340. It can also be used to transfer data from host computer 340 to firmware memory 328 in camera 12. In particular, it can optionally be used to transfer e-mail addresses or web addresses to firmware memory 328, as described in previously cited U.S. patent application Ser. No. 09/004,046. In case, when the user places the mode dial 336 in the "place order" position, the user can also decide to transmit some or all of the digital images to one or more e-mail addresses, to upload the images to one or more web sites. The e-mail addresses, web site URLs, and image lists are recorded in the DPOF file 412 using the DPOF vendor extension mechanism. In addition, other types of products, such as a Picture CD 28 in FIG. 1 having digital image files stored thereon, photo albums, mugs, T-shirts, etc. may be optionally be ordered from digital camera 12 by uploading the appropriate information from host computer 340 (which may for example be connected to the Internet via a modem (not shown)) to firmware memory 328, or by storing the appropriate information on removable memory card 16.

As illustrated by FIG. 1, memory card 16 may be removed after the image files (e.g. image files 432, 434, 436 and 438) and print utilization file (e.g. DPOF file 412) have been recorded by digital camera 12, and transported to a communication device 20. The communication device 20 is designed to receive the memory card 16, read the appropriate information and forward the information on to a service provider 22 where the images can be uploaded for providing the requested goods and/or services. The communication device 20 is one type of communication device, and is designed to be connected to service provider 22 over a communication network 24. In the particular embodiment illustrated, the communication network 24 comprises phone lines. However it is to be understood that that the communication device may utilize any other type of communication network, including wireless networks. The service provider 22 would produce the appropriate goods and/or services which in the particular embodiment may comprise prints 26, pictures CD 28 having digital image files stored thereon, photoalbums, mug, T-shirts, and other items incorporating personal images. The ordered goods or services can then be returned or provided to the customer. In the case of goods, these are delivered to the customer, for example through the mail system.

The communication device 20 is a relatively simple device that has very few parts and is simple to use. The communication device 20 is shown in block diagram form in FIG. 5. The communication device 20 includes a low cost microprocessor 80 which is controlled by firmware stored in firmware memory 88 and a memory card interface 84 which interfaces with removable memory card 16. Firmware memory 88 can be Flash EPROM memory. The communication device 20 also includes a modem 82. The modem 82 is connected to a telephone connector 29 which is designed to be connected to a phone line in the same manner as a phone and other similar type equipment. It should be noted that the microprocessor 80, modem 82, memory card interface 84 and firmware memory 88 can alternately be fabricated on the same integrated circuit.

The communication device 20 also includes two indicating lights 34 and 36. In the embodiment illustrated indicating light 34 is a green status light indicating that the digital data has been sent to the service provider and indicating light 36 is a red light that indicates that the data has not yet been transmitted to the service provider 22.

A power connector 32 is provided for providing electrical power to the power supply 86 within communication device 20. The communication device 20 also includes a start button 38 which is be used to initiate operation of device 20 by the user. Alternately, insertion of the memory card can be automatically detected by memory card interface 84 so that the start button 38 is not required.

The microprocessor 80 in the communication device 20 reads DPOF file 412 to determine which images need to be transmitted to the service provider 22. Additionally, the microprocessor 80 includes an internal clock (not shown) that is regulated in accordance with a standard time clock such that the transmission of digital data occurs at certain designated time periods. For example, data may be transmitted only at off hours, (e.g. during the middle of the night) when transmission rates are low and there is a relatively lower chance of disruption to the user in the use of the network system. It is of course understood that the communication device 20 may be programmed for allowing transmission during at any desired time period. A status light 40 may also be provided for indicating that power is being supplied to the communication device 20.

Figure 5:
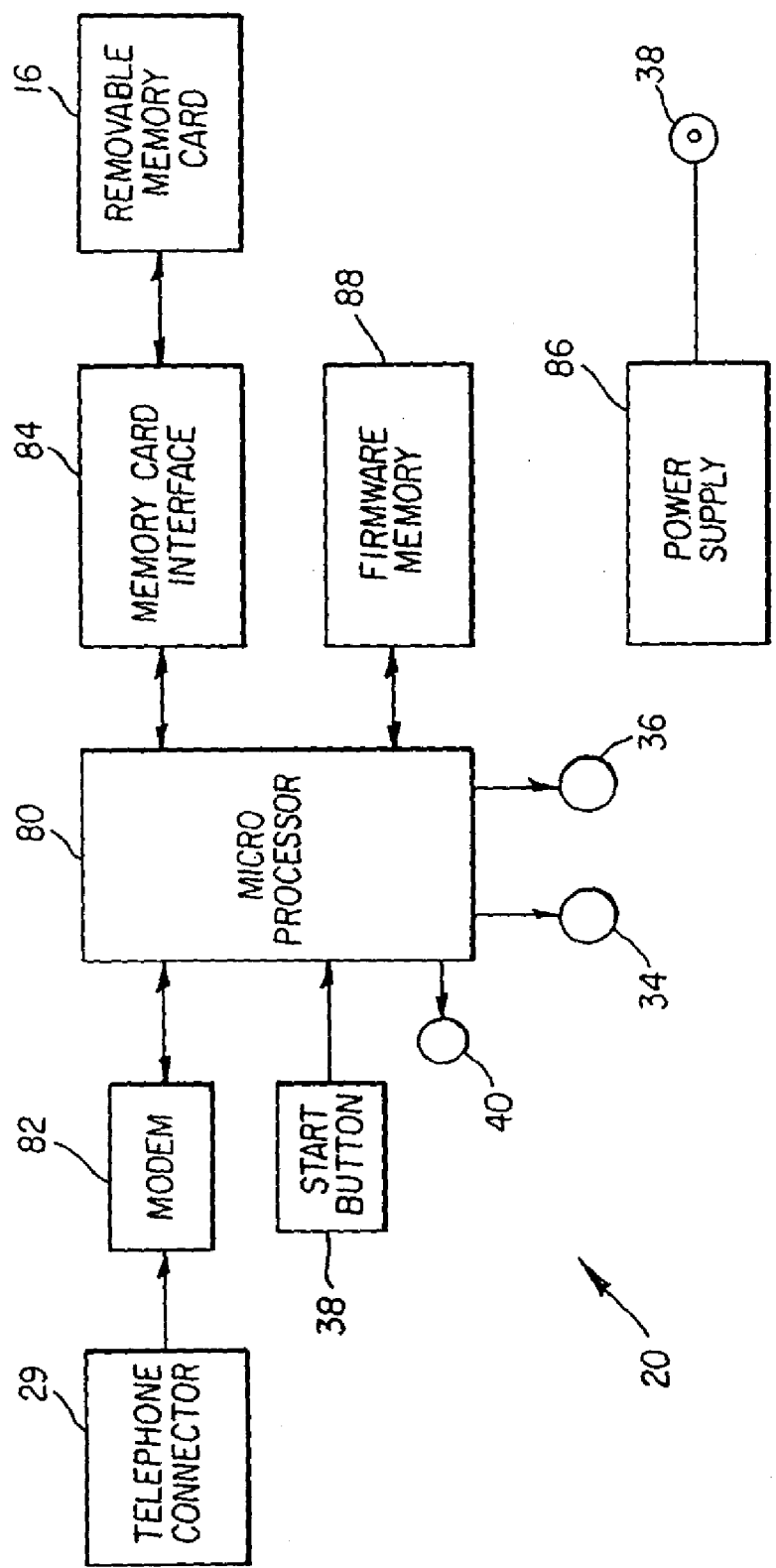
FIG. 5 illustrates in block form the transmitting device depicted in FIG. 2.

The communication device 20 may be simpler or alternately more complex, than the device depicted in FIG. 5. In order to minimize the cost and maintenance of the communication device 20, the communication device 20 may be preprogrammed with a phone number of the service provider 22 which will be automatically accessed over the phone lines. Alternate or back-up phone numbers can be also programmed in the event that the first number called is busy or becomes inaccessible. However, this is transparent to the user as this may be automatically done by the software program used to operate device 20. This software program, along with the appropriate phone numbers, is stored in firmware memory 88, which may be a Flash EPROM memory.

In order for the customer to obtain the appropriate services from the service provider 22, the owner of device 20 registers the serial number of the device and provides an appropriate method for paying for the goods and/or services that are to be provided. For example, a payment identifier (e.g. a credit card or debit card number) of a customer account could be provided at time of registration. The customer's account that is debited can, of course, be located at a remote financial institution. Typically, as with credit cards, this financial institution will make payment to service provider 22. This is generally done by wiring the amount into the direct provider's account, generally an account established with another financial institution. Alternately, the customer could be billed or maintain an account which is billed on a periodic basis and would remain opened as long as the customer appropriately pays in an appropriate manner.

Figure 2:
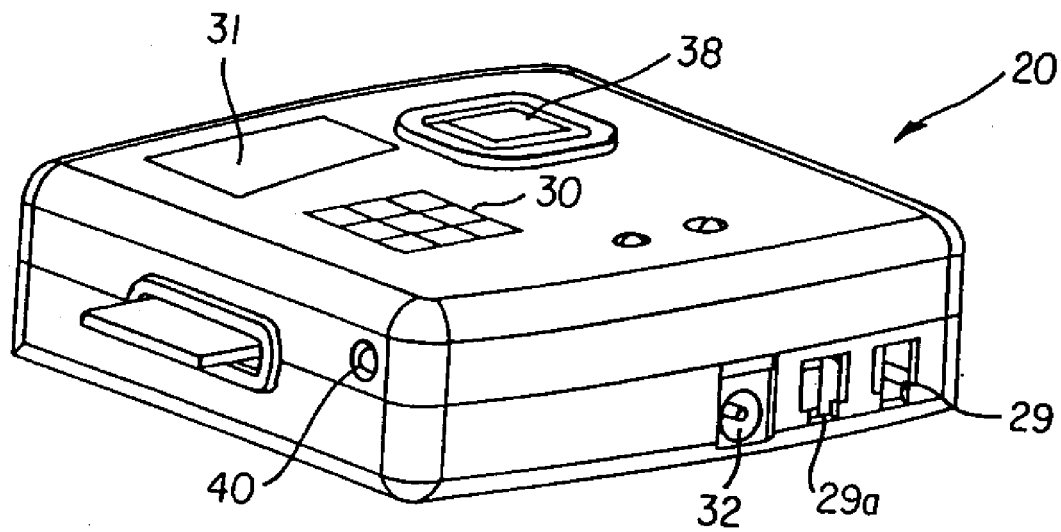
FIG. 2 is an enlarged view of a modified transmitting device made in accordance with the present invention.
Figure 3:
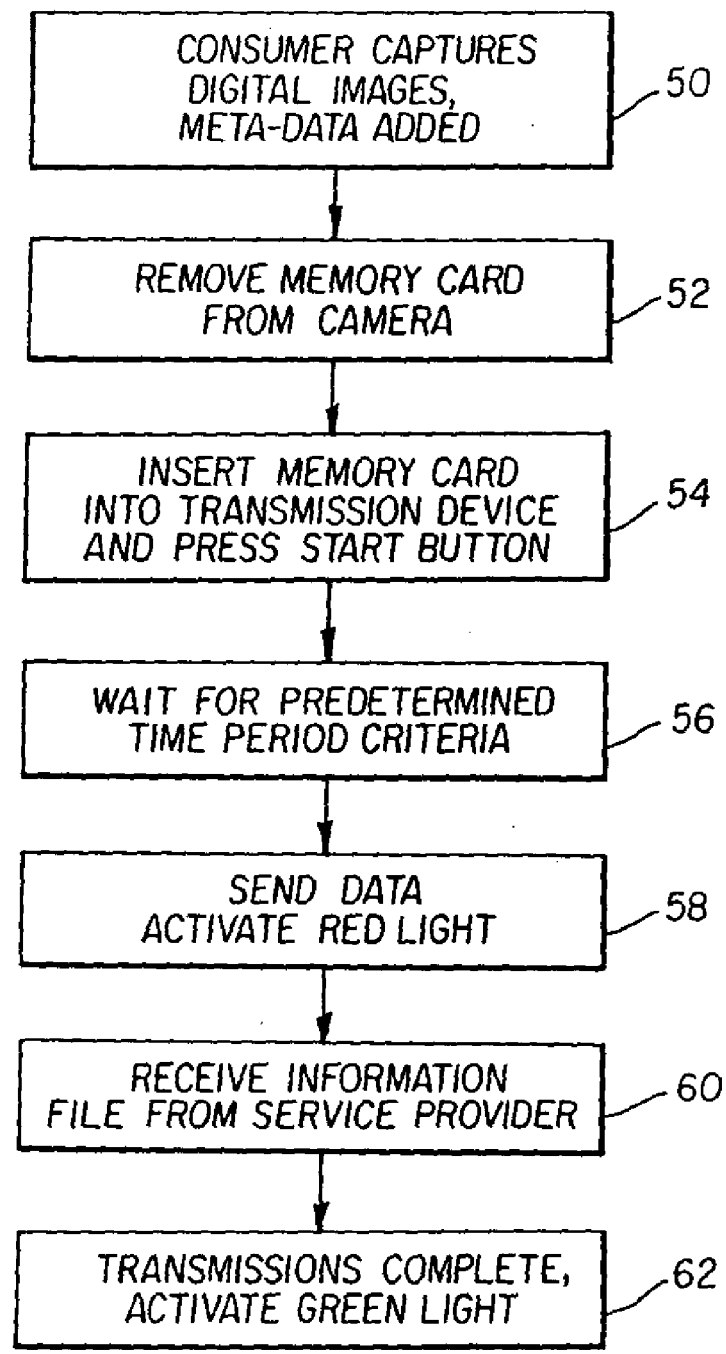
Figure 4:
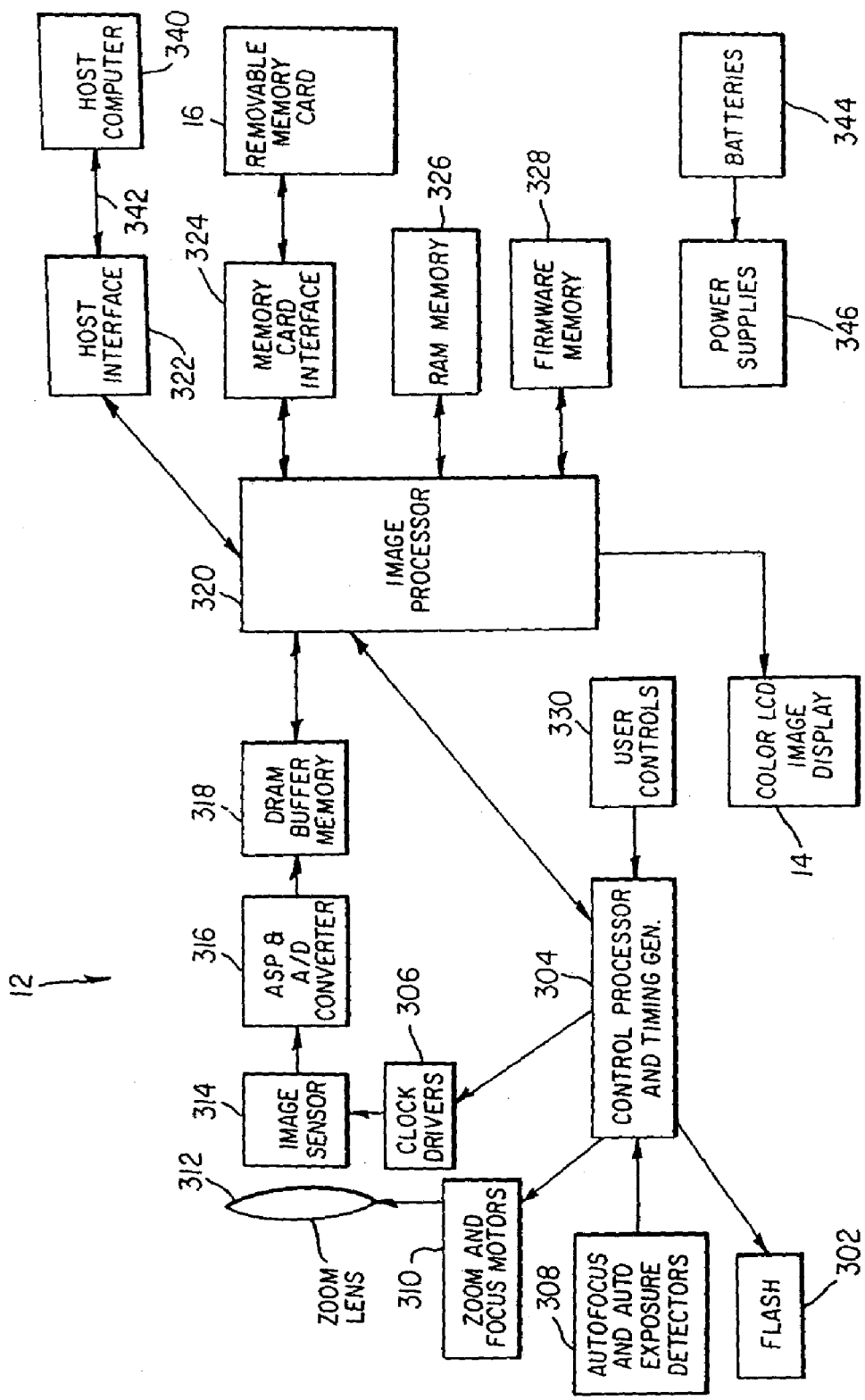

In an alternative embodiment depicted in FIG. 2, communication device 20 includes an input mechanism, such as a key pad 30 for programming of phone numbers and then entering of data for registration and/or charging of appropriate credit card accounts. The communication device 20 also includes a display 31, which can be a monochrome status LCD information display or a color image LCD for viewing and selecting the images stored on removable memory card 16. A second output phone line connector 2A is provided such that the communication device 20 can be placed serially in a phone line of an existing product without disrupting operation of the phone system. The communication device 20 of FIG. 2 is similar to that of FIG. 1, like numerals indicating like parts and operation, except for the addition of these components, which connect with microprocessor 520. The addition of these features will of course increase the cost of the device 20. Additional features such as an answering machine, telephone handset, and other phone related services may also be provided to make the communication device 20 a multi-functional device.

In one form of the present invention, the consumer buys a digital camera or signs up for service from service provider 22. This may be done via a network such as the Internet, using the method described in commonly-assigned U.S. patent application Ser. No. 09/534,471, filed Mar. 24, 2000, entitled "LEASING A CONFIGURED CAMERA SYSTEM", to Paruiski, the disclosure of which is herein incorporated by reference. The customer is given the communication device 20. The customer may be charged for the device or may get the communication device free or at a reduced fee. The consumer provides a payment identifier, phone number, and address to the service provider. Alternatively, the network service provider may be responsible for billing, so the credit card number will be unnecessary.

After the consumer has inserted the memory card 16 into the communication device 20, the customer may press button 38 to initiate data transfer. Alternatively, the communication device 20 may wait to initiate data transfer until a predetermined time when transmission rates are low or use of the transmission network by the consumer is unlikely. The communication device 20 may make a call to the service provider immediately to receive a preferred time for transmission. This preferred time may be determined by the service provider on the basis of lowest transmission rates, volume of data being received at the service provider, or unlikely utilization of the transmission network by the consumer. The communication device 20 may also monitor consumer usage of the transmission network and choose transmission times (periods) which are unlikely to interfere with other consumer usage. If the communication device 20 should lose its time reference, it may call the service provider 22 to reprogram its clock. The device may also include an input device for correcting of the internal time clock of the device 20. Alternatively, the service provide 22 may check the device 20 to determine that the internal clock is correct. If the internal clock of device 20 is not correct, the service provider 22 may reprogram the device 20 with the correct time by providing appropriate commands. The communication device 20 is dedicated to the service provider 22. When the communication device 20 calls the service provider 22, it provides a unique identification number (unique ID) to the service provider 22. This identification number is stored in firmware memory 88 and is not known to the user. The service provider 22 receives the identification number and then enables the device 20 to function in order to transfer images. The communication device 20 is programmed to call only the number provided by the service provider 22. In the event that the service provider 22 changes phone lines by which the appropriate communication is to be made, this can also be downloaded to the communication device 20 automatically by the service provider. Since the service provider is the only entity that knows the unique identification number of the communication device 20, the number can not be inadvertently removed or changed.

It is also possible to order a specific type of goods and/or services. This can be done either at the time of registration (e.g. by requesting specific types of prints or services from a plurality of options) through use of the camera providing appropriate order information as described earlier in reference to FIG. 4, or by the use of a keypad as illustrated in the embodiment of FIG. 2. In the latter case, for example, the product list can be provided to the consumer by the service provider as a printed flier or catalog, allowing the customer to enter appropriate codes into the communication device 20 for goods or services to be associated with the images to be transmitted. For example, but not by way of limitation, enlargements, reprints, photo-albuming, placement of images on T-shirts, mugs, etc, may be ordered. Many other goods and/or services may be ordered in this manner. The keypad 30 could also be used to select images to be printed, and could be used to create a utilization file similar to DPOF file 412 which would then be transmitted from communication device 20 to service provider 22 along with the appropriate digital image files.

Figure 3:
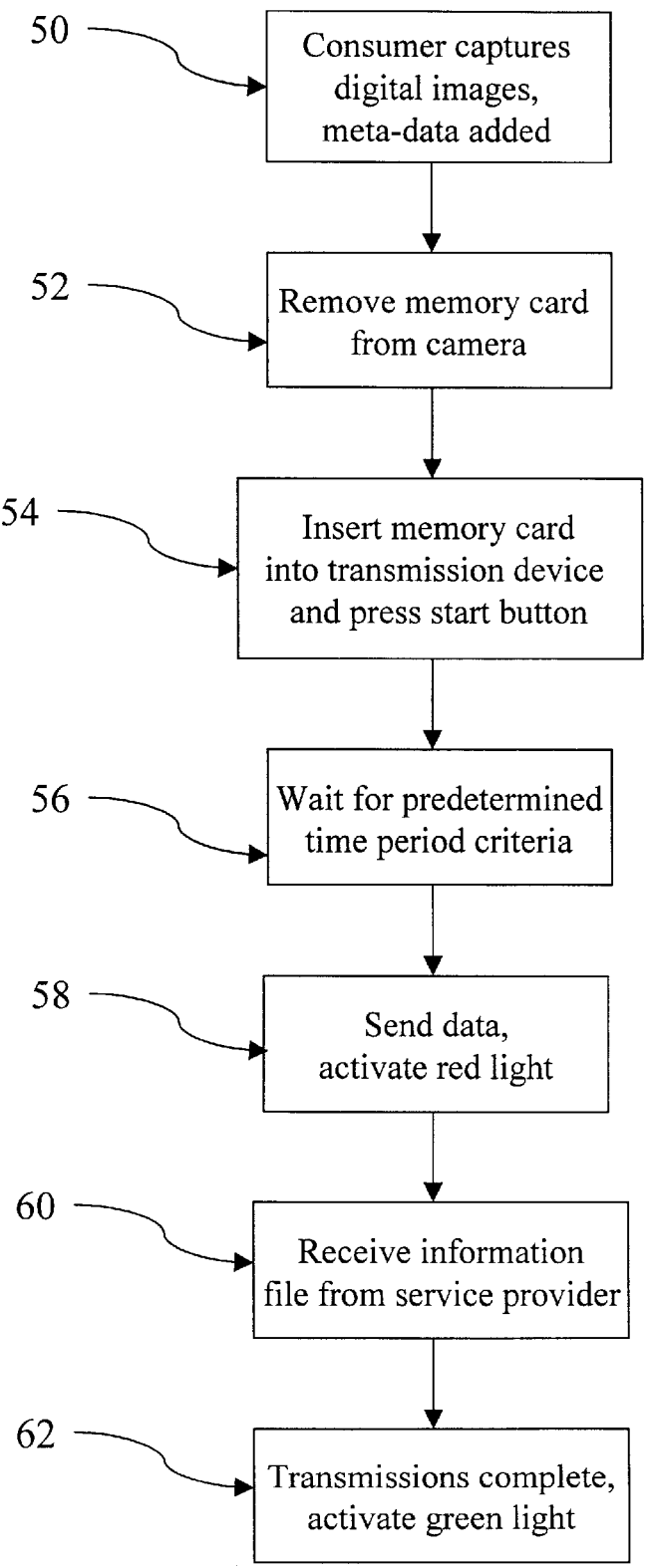
FIG. 3 is a flow chart illustrating the method of operation of the system of FIG. 1.

In order to more clearly understand the present invention, a description of the operation of device 20 in system 10 will now be discussed as 30 illustrated by FIG. 3. In block 50, the consumer captures appropriate digital images with the digital camera 12 which are stored on removable memory card 16 as Exif image files containing appropriate meta data. When the consumer has completed capturing of the images and creating an appropriate DPOF order file 412 in FIG. 6, the memory card 16 at block 52 is removed from the camera 12 and inserted into communication device 20. After insertion of the memory card 16 at block 54, the start button 38 is activated. Alternately, the insertion of the memory card can be automatically detected, so that the start button 38 is not needed. Thereafter, the device 20 will remain dormant at block 56 until the predetermined time period criteria has been met for transmitting of the data to the service provider. For example, if the communication device 20 has been programmed to transmit the digital images and DPOF file 412 during the time period from 12 Midnight to 3 in the morning, the communication device 20 will remain dormant and then at block 58 will send the data at the appropriate time. The red light will be maintained as long as the images have not yet been transferred. In the unlikely event that the consumer needs the phone while data transmission is being conducted, transmission will terminate. This information can be noted by communication device 20 and when the phone line frees up, the continued transmission can be automatically re-instituted at the point at which it was stopped. Since the communication device 20 is designed to be used by a single service provider 22, this limits the complexity of the communication device 20 and precludes the need for a user interface in more expensive models such as shown in FIG. 2. Upon completion of transmission of the device at block 62, the green indicating light 34 is activated. The digital image files and DPOF file 412 may be deleted upon successful transmission to the service provider 22, thus freeing image memory card 16 for use by the camera 12. Alternatively the digital image files and associated data may be retained on the memory card for the customer's use.

At step 60, the service provider 22 downloads one or more thumbnail image files to the communication device 20, which records these thumbnail image files on removable memory card 16. These thumbnail image files (e.g. files 424 and 426) are displayed on the color LCD image display 14 on the camera when the user places the mode dial 336 in the "order status" position, as described earlier in relation to FIG. 4. The thumbnail image files (e.g. files 424 and 426) can contain text and icons to acknowledge how many images have been received, and what good/ services are to be provided. The thumbnail image files (e.g. files 424 and 426) can also include other information, such as how much the order will cost, the expected arrival time, and other product offerings, including promotional offers.

The invention has been described in detail with particular reference to certain preferred embodiments thereof, but it will be understood that variations and modifications can be effected within the scope of the invention. The present invention being defined the claims that follow.

Parts List 2A. second output phone line connector
10. system
12. electronic digital still camera
14. liquid crystal display (LCD)
16. removable memory card
20. communication device
22. service provider
24. communication network
26. prints
28. Picture CD
29. telephone connector
30. key pad
31. display
32. power connector
34. indicating light
36. indicating light
38. start button
40. status light
50. block
52. block
54. block
56. block
58. block
62. block
80. microprocessor
82. modem
84. memory card interface
86. power supply
88. firmware memory
302. flash 304. timing generator circuit
306. clock drivers
308. auto-exposure detectors
310. focus motors
312. zoom lens
314. image sensor
316. converter circuit
318. DRAM buffer memory
320. processor
322. shutter button
324. memory card interface
326. RAM memory
328. firmware memory
330. user controls
332. LCD image display
334. zoom lens control
336. mode dial
340. host computer
341. optical view finder
342. interface cable
344. batteries
346. power supply
360. push buttons
362. push buttons
364. push buttons
400. root directory
410. MISC directory
412. file
420. DCIM directory
422. subdirectory
424. file
425A file
425B file
426. file
427A. file
427B file
430. subdirectory
432. JPEG compressed Exif image file
434. JPEG compressed Exif image file
436. JPEG compressed Exif image file
438. JPEG compressed Exif image file
520. microprocessor

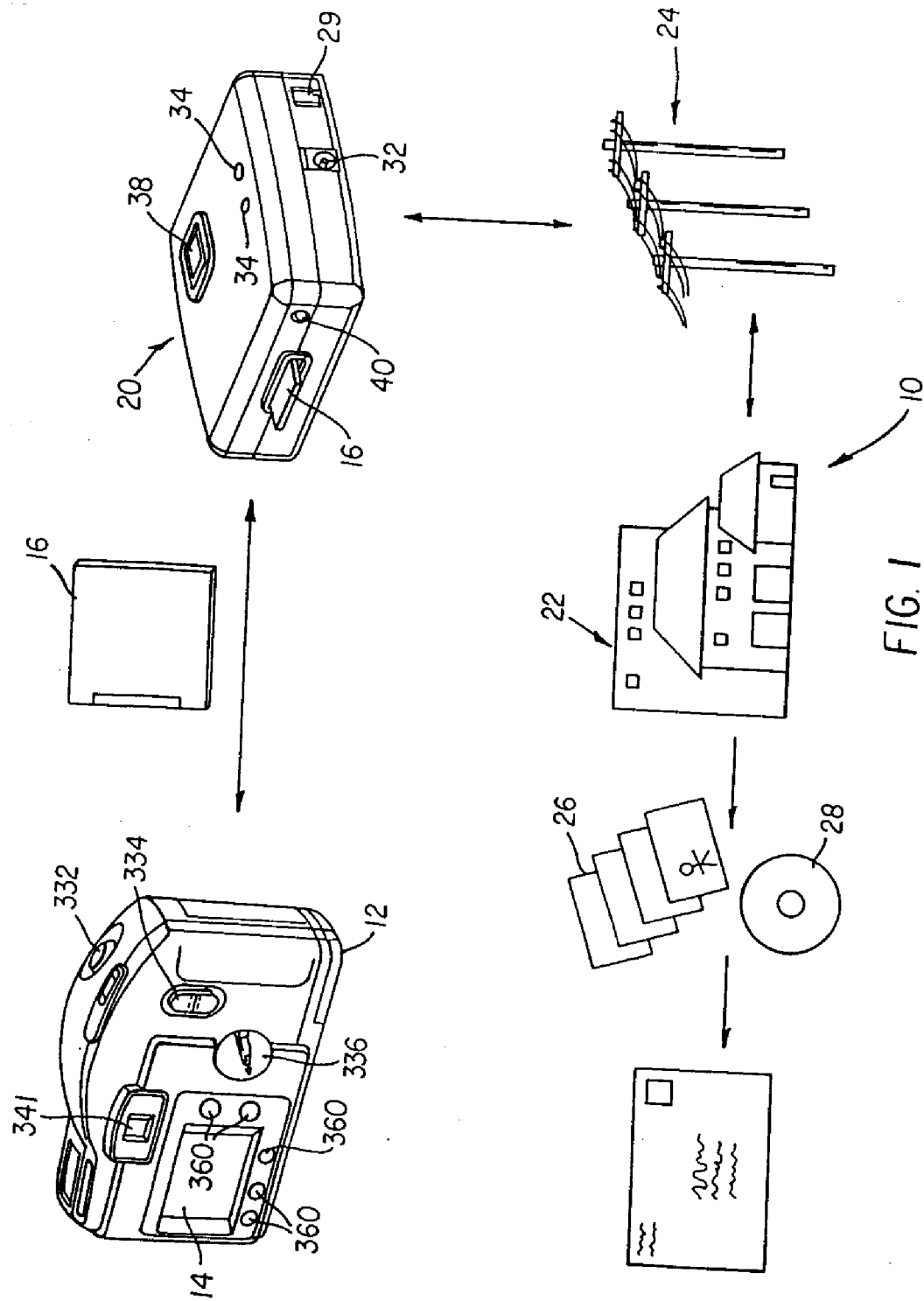

What is claimed is:

1. A digital camera for capturing images to be transferred over a communication network to a service provider for providing goods or services using images from a digital camera registered with said service provider, comprising:
   means for capturing digital images;
   an interface for storing the captured digital images as image files on a removable digital storage media in a first directory, and for reading said image files from both said first directory and confirmation files from a second directory on said removable digital storage media, wherein said confirmation files are provided by the service provider, said confirmation files indicate the status of an order to be fulfilled by said service provider using said captured digital images;
   a user interface for selecting the first directory or the second directory; and
   a display for displaying the digital images from the selected directory.

2. A digital camera according to claim 1 wherein the image stored by the service provider provides confirmation that at least one image previously stored in said first directory on said removable storage media has been transmitted to the service provider.

3. A digital camera according to claim 1 wherein the confirmation files comprise low resolution images.

4. A digital camera according to claim 1 wherein said confirmation files includes a text file.

5. A digital camera for capturing images to be provided to a service provider over a communication network, said service provider providing goods or services using images received from said digital camera registered with said service provider, comprising:
   a capture device for capturing digital images;
   an interface for storing the captured digital images as image files on a removable digital storage media in a first directory, and for reading said image files from both said first directory and confirmation files from a second directory on said removable digital storage media, wherein said confirmation files stored on said second directory is obtained from a different source other than the camera.
   a user interface for selecting the first directory or the second directory; and
   a display for displaying the digital image files stored in said first directory and said confirmation files stored in the second directory.

6. A digital camera according to claim 5 wherein said user interface comprises a switch.

7. A digital camera according to claim 5 wherein when said user interface is positioned to read from said second directory, an order confirmation from said service provider can be viewed.

8. A digital camera according to claim 7 wherein said order confirmation includes low resolution images.

9. A digital camera according to claim 5 wherein an order can be placed.

10. A digital camera according to claim 5 wherein said display device comprises a liquid crystal display.

11. A method for placing and/or reviewing an image order using a camera having a capture device for capturing digital images as image files;
   an interface for storing the captured digital images on a removable digital storage media in a first directory and for reading digital image files from both said first directory and from a second directory on said removable digital storage media wherein said second directory contains confirmation files stored by the service provider;
   a user interface for selecting the first directory or the second directory; and
   a display for displaying the digital image files stored in said first directory and said confirmation files stored in the second directory, comprising the steps of:
   selecting images in said first directory and placing them in said second directory and placing an order with said image provider with respect to said images in said second directory.

12. A method for placing with a service provider over a communication network using a registered camera and/or reviewing an image order using said camera, said camera having a capture device for capturing digital images;
   providing an interface for storing the captured digital images as image files on a removable digital storage media in a first directory and for reading digital images from both said first directory and for reading confirmation files stored on a second directory on said removable digital storage media wherein said second directory contains said confirmation files stored by the service provider:
   a user interface for selecting the first directory or the second directory;

registering said camera with said service provider;

capturing images using said camera:

transferring the captured images over said communication network to the service provider;

receiving a confirmation file from the service provider, said confirmation files indicating the status of an order to be fulfilled by said service provider with respect to the transferred captured digital images;

storing said confirmation files in said second directory;

a display for displaying the confirmation files stored in the second directory, comprising the steps of:

reviewing said confirmation file with respect to said images in said second directory.

13. A method according to claim 12 further comprising the step of reviewing low resolution images and/or text in said second directory provided by said service provider.

* * * * *

UNITED STATES PATENT AND TRADEMARK OFFICE
CERTIFICATE OF CORRECTION

PATENT NO.   : 6,812,961 B1
DATED        : November 2, 2004
INVENTOR(S)  : John R. Fredlund et al.

It is certified that error appears in the above-identified patent and that said Letters Patent is hereby corrected as shown below:

Drawings,
Figures 1-6, should be substituted with the attached formal Figures 1-6.

Signed and Sealed this

Fifteenth Day of February, 2005

JON W. DUDAS
*Director of the United States Patent and Trademark Office*